(12) United States Patent
Hertling

(10) Patent No.: US 6,757,741 B1
(45) Date of Patent: Jun. 29, 2004

(54) SYSTEM AND METHOD FOR NETWORK PRINTING USING A PEER HYBRID PRINTING PROTOCOL

(75) Inventor: William Hertling, Portland, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 814 days.

(21) Appl. No.: 09/640,855

(22) Filed: Aug. 17, 2000

(51) Int. Cl.⁷ .............................................. G06F 15/16
(52) U.S. Cl. .................. 709/245; 709/201; 709/202; 709/203; 709/217; 709/225
(58) Field of Search ............................... 709/201–203, 709/217, 225, 245

(56) References Cited

U.S. PATENT DOCUMENTS

| | | |
|---|---|---|
| 5,745,747 A | 4/1998 | Chang et al. |
| 5,787,237 A | 7/1998 | Reilly |
| 5,933,584 A * | 8/1999 | Maniwa ..................... 358/1.15 |
| 6,006,281 A * | 12/1999 | Edmunds ........................ 710/1 |
| 6,373,585 B1 * | 4/2002 | Mastie et al. ............... 358/1.15 |
| 6,384,923 B1 * | 5/2002 | Lahey ........................ 358/1.13 |
| 6,401,150 B1 * | 6/2002 | Reilly ......................... 710/104 |
| 6,476,927 B1 * | 11/2002 | Schwarz, Jr. .............. 358/1.15 |
| 6,604,148 B1 * | 8/2003 | Dennison .................... 709/245 |

FOREIGN PATENT DOCUMENTS

GB    2331387    * 5/1999

* cited by examiner

Primary Examiner—Nabil El-Hady

(57) ABSTRACT

A system and a method are provided for printing on a network. In one embodiment, broadly stated the method comprises the steps of: generating a print job ticket in a client, the print job ticket being associated with a full print job; transmitting the print job ticket to a queue server; placing the print job ticket in a queue in the queue server; transmitting the print job ticket from the queue server to a print server; transmitting a request for a full print job from the print server to the client; and, transmitting the full print job that encompasses a document to be printed from the client to the print server in response to the request.

6 Claims, 4 Drawing Sheets

SYSTEM AND METHOD FOR NETWORK PRINTING USING A PEER HYBRID PRINTING PROTOCOL

TECHNICAL FIELD

The present invention is generally related to the field of network printing and, more particularly, is related to a system and method for network printing using a peer hybrid printing protocol.

BACKGROUND OF THE INVENTION

In printing documents from client computers and other devices to network printers, various printing protocols are used. Three such typical printing protocols employed include client-server printing, server-side-rendering (SSR) client-server printing, and peer-to-peer printing. These protocols are used by the various devices on the network to cause the printing of a particular document from the client. Such devices may include, for example, one or more clients, a queue server, a print server, and a printer, etc.

To print a document using client-server printing, for example, an application in a client first makes graphical device interface (GDI) calls to the operating system in the client. The operating system then creates enhanced meta file data (EMF data) from the GDI calls that are handed to a printer driver. The printer driver then renders the EMF data into printer ready bits (PRB) that form a print job. The print job is applied to the operating system to be transmitted over the network to the queue server for printing.

The queue server then receives the print job and places it in a queue associated with a particular printer. When the printer is ready to receive the print job, the queue server transmits the print job over the network to the print server. The print server then applies the print job to the printer for printing. Unfortunately, the client-server approach requires the entire document to be transmitted on the network twice, thereby consuming a potentially large amount of network bandwidth.

In server-side-rendering, (SSR) client-server printing, an application in a client first makes GDI calls to the operating system in the client. The operating system then creates EMF data from the GDI calls. The EMF data is transmitted over the network to a queue server. In the queue server, the EMF data is placed in a queue for printing. When the document is to be printed, the corresponding EMF data is applied to a printer driver in the queue server that renders the EMF data into printer ready bits (PRB) that form a print job. When the printer is ready to receive the print job, the print job is applied to the operating system in the queue server to be transmitted over the network to the print server for printing. The print server then applies the print job to the printer for printing. Unfortunately, the SSR client-server approach also requires the entire document to be transmitted on the network twice, once as EMF data and once as printer ready bits. This results in the consumption of a potentially large amount of network bandwidth. In addition, the centralization of the printer driver on the queue server can stress the computing capacity of the queue server to effectively render the EMF data into printer ready bits (PRB). This is especially a concern given that a number of printer drivers may be placed on the queue server to service a number of printers.

In peer-to-peer printing, an application in a client first makes GDI calls to the operating system in the client. The operating system then creates EMF data from the GDI calls that are handed to a printer driver in the client. The printer driver then renders the EMF data into printer ready bits (PRB) that form a print job. The print job is applied to the operating system in the client to be transmitted over the network directly to the print server for printing.

When the print server is ready to receive data, the operating system in the client transmits the print job to the print server. The print server then applies the print job to the printer for printing. Although, the peer-to-peer printing approach only requires the entire document to be transmitted on the network once, the peer-to-peer approach does not facilitate centralized printer control or queuing.

SUMMARY OF THE INVENTION

In light of the foregoing, the present invention provides for a system and method for network printing of a document. In one embodiment, the network includes a client coupled to the network, the client having a first processor coupled to first local interface and a first memory coupled to the first local interface. The client also includes send job logic stored on the first memory and executable by the first processor. The send job logic includes logic to generate a print job ticket associated with a full print job, and logic to transmit the print job ticket to a queue server that is coupled to the network.

The queue server includes a second processor coupled to second local interface and a second memory coupled to the second local interface. The queue server also includes print queue logic stored on the second memory and executable by the second processor. The print queue logic includes logic to place the print job ticket in a queue in the queue server, and logic to transmit the print job ticket from the queue server to a print server that is coupled to the network.

The print server has a third processor coupled to third local interface and a third memory coupled to the third local interface. The print server further includes print server logic stored on the third memory and executable by the third processor. The print server logic comprises logic to determine an address of the client on the network from the print job ticket received from the queue server, logic to transmit a request for a full print job to the client, and logic to apply the full print job received from the client to the printer.

In addition to the above system, further aspects of the present invention include the functionality of each of the client, queue server, and print server related to the printing protocol employed to print a document on a network printer.

The present invention may also be viewed as a method for printing on a network. Broadly stated, the method comprises the steps of: generating a print job ticket in a client, the print job ticket being associated with a full print job; transmitting the print job ticket to a queue server; placing the print job ticket in a queue in the queue server; transmitting the print job ticket from the queue server to a print server; transmitting a request for a full print job from the print server to the client; and, transmitting the full print job from the client to the print server in response to the request.

In addition to the above method, further aspects of the present invention include the steps taken with reference to the individual client, queue server, and print server related to the printing protocol employed to print a document on a network printer.

The systems and method of the present invention provide several advantages, such as, printing documents on a network printer while using less bandwidth and at the same time retaining centralized control over the printing functions of the network.

Other features and advantages of the present invention will become apparent to a person with ordinary skill in the art in view of the following drawings and detailed description. It is intended that all such additional features and advantages be included herein within the scope of the present invention.

BRIEF DESCRIPTION OF THE SEVERAL VIEWS OF THE DRAWINGS

The invention can be understood with reference to the following drawings. The components in the drawings are not necessarily to scale. Also, in the drawings, like reference numerals designate corresponding parts throughout the several views.

DETAILED DESCRIPTION OF THE INVENTION

Figure 1:
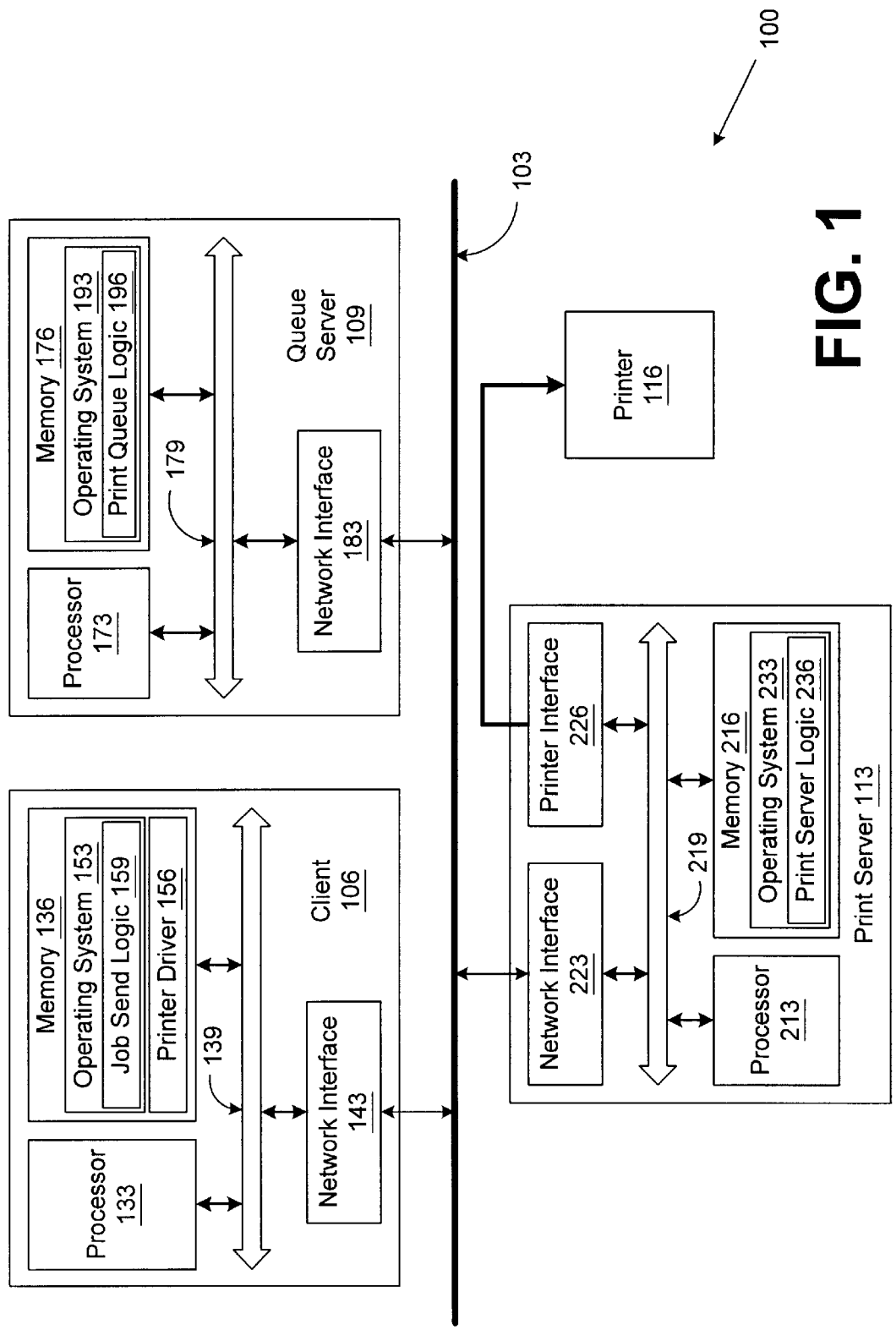
FIG. 1 is a block diagram of a network according to an embodiment of the present invention.

With reference to FIG. 1, shown is a printing network 100 according to an embodiment of the present invention. The printing network 100 includes a network 103 to which is coupled a client 106, a queue server 109, and a print server 113. A printer 116 is coupled to the print server 113 as shown.

The client 106 includes a processor circuit that includes a processor 133 and a memory 136, both of which are coupled to a local interface 139. The local interface 139 may be a data bus with an accompanying control bus as known by those with ordinary skill in the art. The client 106 further includes a network interface 143 that couples the local interface 139 to the network 103. Through the network interface 143, data may be transmitted from the local interface 139 to the network 103 to any other device on the printing network 100. Also, the network interface 143 makes data transmitted via the network 103 available on the local interface 139. Thus, the network interface 143 may be, for example, a network interface card, modem, or other interface that includes appropriate buffer circuitry and transmission circuitry, etc., to accomplish these tasks. In this respect, the network 103 may comprise a local area network, a wide area network, or the Internet, etc.

The client 106 also features an operating system 153 and a printer driver 156 stored in the memory 136 and executable by the processor 133. The operating system 153 is executed to control and/or perform the various functions of the client 106 in a similar manner to operating systems known by those with ordinary skill in the art. However, according to the present invention, the operating system 153 further includes job send logic 159 that is executed in order to interface with the queue server 109 and the print server 113 to print a document as will be discussed. Such a document (not shown) generally results from the operation of a particular application (not shown) on the client 106 as is generally known by those with ordinary skill in the art. The printer driver 156 is employed by the client device 106 to render enhanced meta file (EMF) data into printer ready bits (PRBs) as is known by those with ordinary skill in the art. The particular printer driver 156 that is used is compatible with the printer 116.

The queue server 109 includes a processor circuit that includes a processor 173 and a memory 176, both of which are coupled to a local interface 179. The local interface 179 may be a data bus with an accompanying control bus as known by those with ordinary skill in the art. The queue server 109 further includes a network interface 183 that couples the local interface 179 to the network 103. The network interface 183 is similar to the network interface 143 and is not described in great detail.

The queue server 109 further comprises an operating system 193 that is executed to control and/or perform the various functions of the queue server 109 in a similar manner to operating systems known by those with ordinary skill in the art. However, according to the present invention, the operating system 193 additionally includes print queue logic 196 that is executed to interface with the client 106 and the print server 113 in accomplishing the tasks of queuing and generally printing a document from the client 106 on the printer 116 as will be discussed.

The print server 113 includes a processor circuit that features a processor 213 and a memory 216, both of which are coupled to a local interface 219. The local interface 219 may be a data bus with an accompanying control bus as known by those with ordinary skill in the art. The print server 113 further includes a network interface 223 that couples the local interface 219 to the network 103. The network interface 223 is similar to the network interface 143 and is not described in great detail.

The print server 113 also includes a printer interface 226 that may be a printer interface card that couples the printer 116 to the local interface 219. In this regard, the printer interface 226 may comprise an appropriate printer card, etc., as known by those with ordinary skill in the art.

The print server 113 further comprises an operating system 233 that is executed to control and/or perform the various functions of the print server 113 in a similar manner to operating systems known by those skilled in the art. However, according to the present invention, the operating system 233 additionally includes print server logic 236. The print server logic 236 is executed to interface with the client 106 and the queue server 109 in accomplishing the tasks of queuing and generally printing a document from the client 106 on the printer 116 as will be discussed.

Additionally, the memories 136, 176, and 216 may include both volatile and nonvolatile memory components. Volatile components are those that do not retain data values upon loss of power. Conversely, nonvolatile components retain data upon a loss of power. Thus, the memories 136, 176, and 216 may comprise, for example, random access memory (RAM), read-only memory (ROM), hard disk drives, floppy disks accessed via an associated floppy disk drive, compact disks accessed via a compact disk drive, magnetic tapes accessed via an appropriate tape drive, and/or other memory components, or a combination of any two or more of these memory components.

Also, each of the processors 133, 173, 213 may represent multiple processors operating in parallel and each of the memories 136, 176, 216 may represent multiple memories. In such a case, each of the local interfaces 139, 179, 219 may be an appropriate network that facilitates communication between any two of the multiple processors or between any one processor and any one of the memories, etc. In addition, the processors 133, 173, 213, memories 136, 176, and 216, and local interfaces 139, 179, 219 may be electrical or optical in nature. The memories 136, 176, and 216 may also be magnetic in nature.

The client 106, the queue server 109, and the print server 113 may include appropriate input/output devices (not shown). In this regard, the input devices may include, for example, but are not limited to a keyboard, keypad, touch pad, touch screen, microphone, mouse, joystick, or one or more push buttons, etc. User output devices may include display devices, indicator lights, speakers, printers, etc. Such display devices may be, for example, cathode ray tubes (CRTs), liquid crystal display screens, gas plasma-based flat panel displays, indicator lights, light emitting diodes, and other display devices.

In addition, the queue server 109 and the print server 113 may also be combined into a single server that performs the functions of both, taking the operation requirements of both into account. That is to say, a combined queue and print server should have a fast enough operating speed to accomplish both functions simultaneously.

Figure 2:
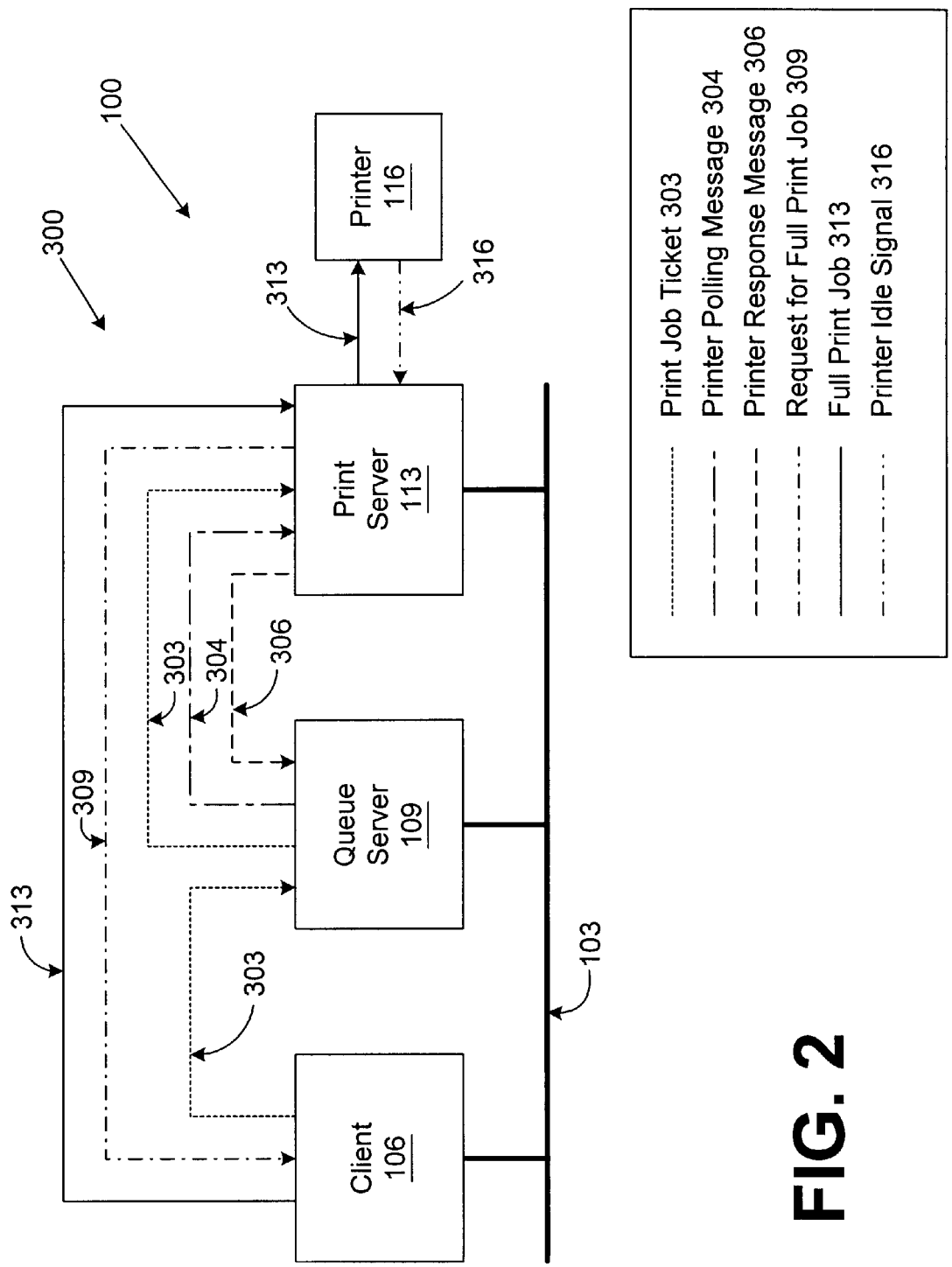
FIG. 2 is a block diagram that depicts a printing protocol implemented on the network of FIG. 1.

With to reference to FIG. 2, shown is a block diagram of the printing network 100 that depicts a printing protocol 300 according to an embodiment of the present invention. The printing protocol 300 provides for communication between the various devices of the printing network 100. In particular, the printing protocol 300 includes a print job ticket 303, a printer polling message 304, a printer response message 306, a request for full print job 309, a full print job 313, and a printer idle signal 316. Each of these data communications are employed as part of the printing protocol 300 to cause a document that resides in the client 106 to be printed on the printer 116.

Assuming that the client 106 includes an application that has generated a document to be printed on the printer 116, the client 106 makes appropriate graphical device interface (GDI) calls to the operating system 153 (FIG. 1). The operating system 153 makes corresponding enhanced meta file (EMF) data from the GDI calls, and hands the EMF data to the printer driver 156. The printer driver 156 renders the EMF data into printer ready bits (PRBs) and sends the resulting full print job to the operating system 153 in PRB format. The operating system 153 then spools the full print job to the memory 136.

The client 106 then generates a print job ticket 303 that includes the address of the client 106 on the network 103, the name or identification of the full print job, and any other pertinent information such as the number of pages to be printed, etc. The client 106 then transmits the print job ticket 303 to the queue server 109. The queue server 109 places the print job ticket 303 in a printing queue maintained in the queue server 109. The queue server 109 then transmits a printer polling message 304 to the print server 113 to determine if the printer 116 is available to print a document. The print server 113 responds with the printer response message 306 that informs the queue server 109 that the printer 116 is busy printing or is available. If the printer 116 is occupied with another print job, the queue server 109 waits for a period of time and then retransmits the printer polling message 304. If the printer 116 is available, the queue server 109 then transmits the print job ticket 303 to the print server 113.

Alternatively, rather than polling the print server 113 as to the printer availability, the queue server 109 may simply wait for a "printer available signal" from the print server 113 signifying that a previous print job sent to the printer 116 has finished. When the "printer available signal" is received, the queue server 109 is informed that the printer 116 is available for another print job.

Once the print server 113 receives the print job ticket 303, the print server 113 examines it to ascertain the client 106 that originated the print job ticket 303, assuming that there are a number of clients 106 on the network 103. The print server 113 then transmits a "request for full print job" 309 to the client 106 based upon the client network address.

In response, the client 106 transmits the full print job 313 to the print server 113. The full print job 313 includes the digital data that makes up the document to be printed in PRB format. Thereafter, the print server 113 transmits the full print job 313 to the printer 116 that prints the document, accordingly. Once the printer 116 has finished printing the document, the printer 116 transmits the printer idle signal 316 back to the print server 113. The print server 113 then waits for another printer polling message 304 to begin the process again. Alternatively, if printer polling is not used by the queue server 109, the print server 113 transmits a "printer available signal" to the queue server 109 to inform the queue server 109 that the printer is ready for the next print job. The print server 113 maintains the availability status of the printer 116 based upon the fact that it sent a full print job 313 to the printer 116 and/or received the printer idle signal 316 from the printer 116.

Figure 3:
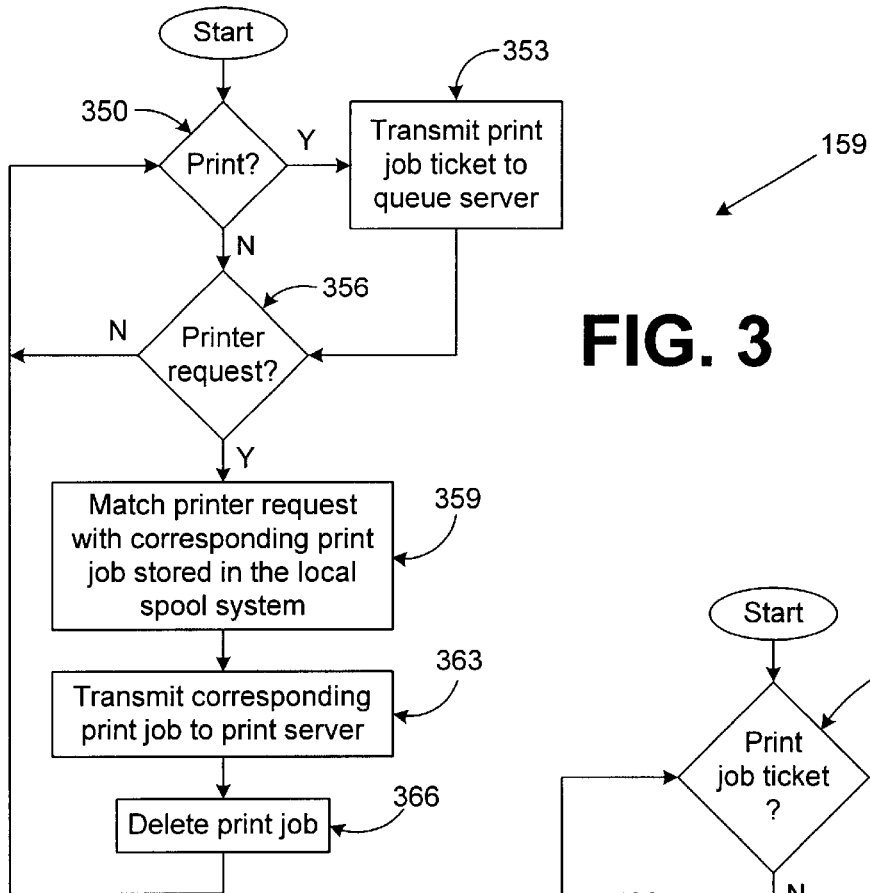
FIG. 3 is a flow chart of job send logic executed by a client in the network of FIG. 1 to implement the printing protocol of FIG. 2.

With the foregoing in mind, reference is made to FIG. 3 that shows a flowchart of the job send logic 159 that is executed by the client 106 (FIG. 1). The job send logic 159 is executed by the processor 133 (FIG. 1) in order to fulfill the role or the client 106 in printing a document on the printer 116 (FIG. 1) according to the printing protocol 300 (FIG. 2). Beginning with block 350, the job send logic 159 determines whether a document is to be printed as mandated by the operating system 153 (FIG. 1). If such is the case then the job send logic 169 moves to block 353 in which the print job ticket 303 (FIG. 2) is generated and transmitted to the queue server 109 (FIG. 2). If there is no document to be printed in block 350, then the job send logic 159 moves to block 356 in which it is determined whether a request for full print job 309 (FIG. 2) has been received from the print server 113 (FIG. 2). Also, after the print job ticket 303 is transmitted to the queue server 109 in block 353, the job send logic 159 moves to block 356 as shown. Thus, the job send logic 159 will continually move between blocks 350 and 356 waiting for either a document to be printed or a printer request to be received from the print server 113.

If there is no request for full print job 309 received from the print server 113 in block 356, then the job send logic 159 reverts back to block 350 as shown. On the other hand, if a request for full print job 309 is received by the client 106 in block 356, then the job send logic 159 moves to block 359. In block 359 the request for full print job 309 is matched with the corresponding print job that is stored in the local spool system of the client 106. Thereafter, in block 363 the full print job 313 (FIG. 2) is transmitted to the print server 113 and in block 366 the full print job 313 is deleted in the client 106. Thereafter, the job send logic 159 reverts back to block 350.

Figure 4:
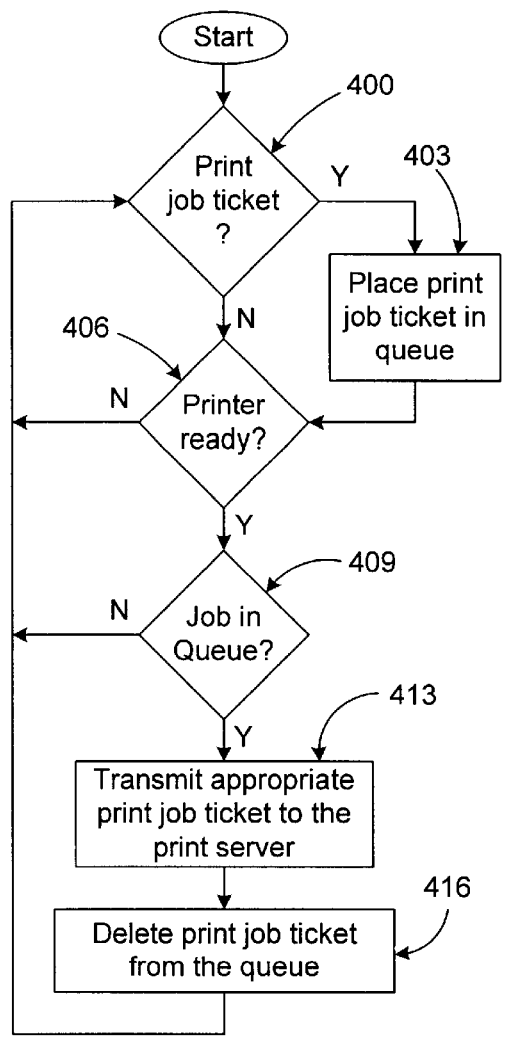
FIG. 4 is a flow chart of print queue logic executed by a queue server in the network of FIG. 1 to implement the printing protocol of FIG. 2.

With reference to FIG. 4, shown is a flowchart of the print queue logic 196 according to another embodiment of the present invention. The print queue logic 196 is executed by the processor 173 (FIG. 1) of the queue server 109 (FIG. 1) to perform the functions of the queue server 109 that relate to the printing protocol 300 (FIG. 2). Beginning with block 400, the queue server 109 determines whether it has received a print job ticket 303 (FIG. 2) from the client 106 (FIG. 2). If so, then the print queue logic 196 moves to block 403. If not, then the print queue logic 196 moves to block 406. Assuming that the print queue logic 196 has moved to block 403, the print job ticket 303 that is received from the client 106 is placed within a printing queue maintained in the queue server 109. The printing queue may be stored, for example, in the memory 176 (FIG. 1). The print queue logic 196 then moves to block 406. Upon reaching block 406, the print queue logic 196 determines whether the printer 116 (FIG. 1) is either idle or printing a document. This is determined, for example, by transmitting the printer polling message 304 (FIG. 2) to the print server 113 to receive the printer response message 306. The printer response message 306 indicates whether the printer 116 is available. Alternatively, the print queue logic 196 may simply wait to receive a printer available signal from the print server 113. If the printer 116 is idle and ready to print a document in block 406, then the print queue logic 196 moves to block 409. Otherwise, the print queue logic 196 reverts back to block 400.

In block 409 the print queue logic 196 determines whether there is a job in the queue that is to be printed. If so, then the print queue logic 196 proceeds to block 413. Otherwise, the print queue logic 196 reverts back to block 400. In block 413, the print queue logic 196 transmits the print job ticket 303 (FIG. 2) to the print server 113. Then, in block 416 the print job ticket 303 is deleted from the printing queue maintained within the queue server 109 as the job has been sent to the print server 113 for printing. Thereafter, the print queue logic 196 reverts back to block 400.

Figure 5:
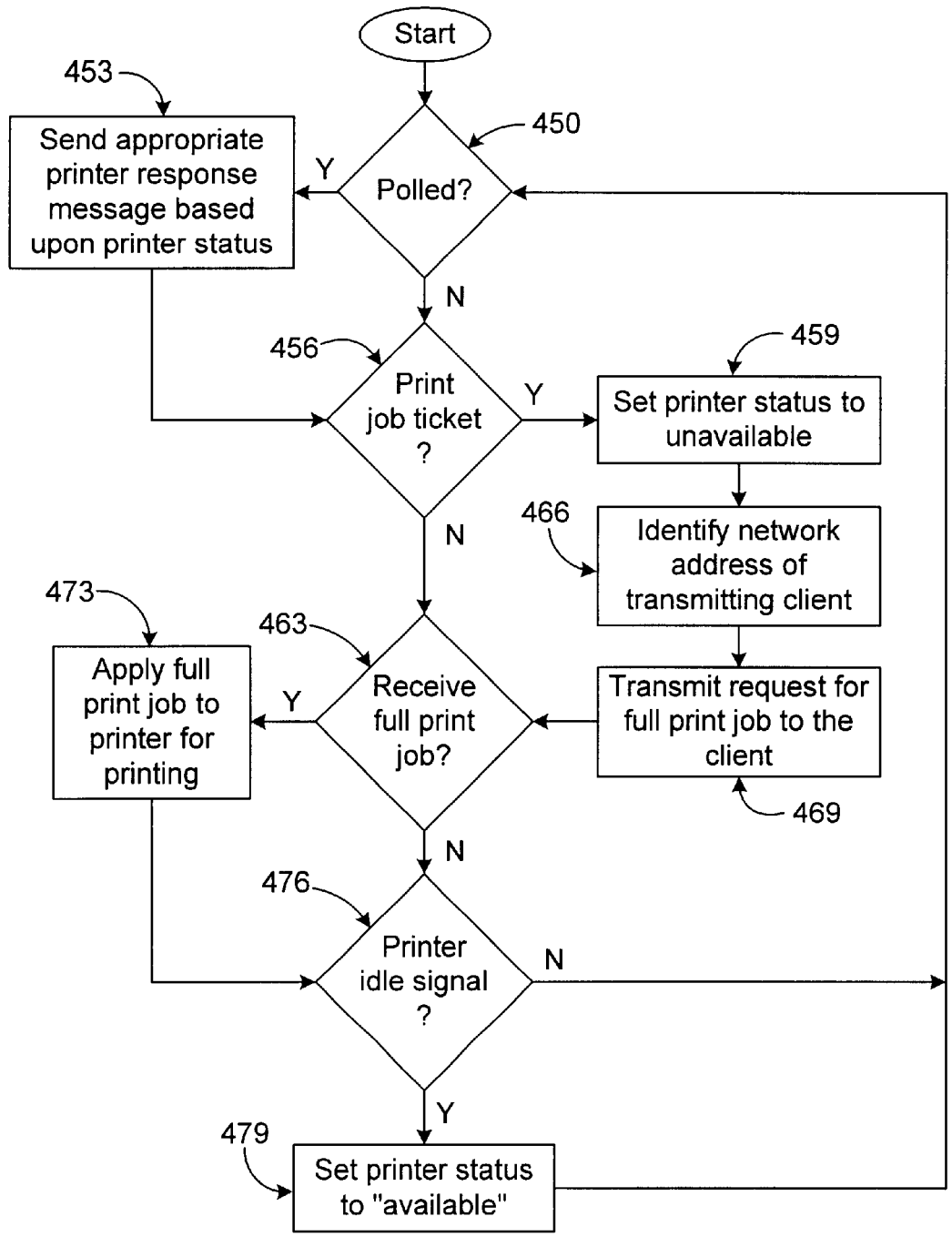
FIG. 5 is a flow chart of print server logic executed by a print server in the network of FIG. 1 to implement the printing protocol of FIG. 2.

With reference to FIG. 5, shown is a flowchart of the print server logic 236 that is executed by the processor 213 (FIG. 1) in the print server 113 (FIG. 1). The print server logic 236 is executed to perform the functions of the print server 113 that relate to the printing protocol 300 (FIG. 2). Beginning with block 450, the print server logic 236 determines if a printer polling message 304 (FIG. 2) has been received. If so, then the print server logic 236 moves to block 453. Otherwise, the print server logic 236 proceeds to block 456. In block 453 the print server logic 236 determines the print status of the print server 113 and the printer 116. When a print job is not being processed based on a previously received print job ticket 303, then the print status is available. Otherwise, the print status is unavailable. The actual print status may be determined in block 453, for example, by examining a bit in the memory 216 (FIG. 1) that maintains the print status. Specifically, the bit may be placed in a logical "0" state indicating an available status or in a logical "1" state indicating an unavailable status. Based on the print status, the print server logic 236 sends an appropriate printer response message 306 (FIG. 2) to the queue server that originally sent the printer polling message 304. Thereafter, the print server logic 236 proceeds to block 456.

In block 456, the print server logic 236 determines whether a print job ticket 303 has been received from the queue server 109. If so, then the print server logic 236 moves to block 459. If not, then the print server logic 236 proceeds to block 463. In block 459 the print server logic 236 sets the print status to "unavailable". This may be accomplished, for example, by setting the previously mentioned printer status bit to a logical "1". Thereafter, in block 466 the network address of the client 106 (FIG. 1) from which the print job ticket 303 originated is determined. Next, in block 469 the print server logic 236 transmits a request for full print job 309 to the client 106. The print server logic 236 then proceeds to block 463.

In block 463 the print server logic 236 determines whether data from a full print job 313 (FIG. 2) is available from the client 106. If so, then the print server logic 236 responds by moving to block 473. If not, the print server logic 236 reverts back to block 450 as shown. In block 473, the data from the full print job 313 is applied to the printer 116 for printing and the print server logic 236 then moves on to block 476 as shown.

In block 476 the print server logic 236 determines whether the full print job 313 has finished printing on the printer 116. If so, then the print server logic 236 proceeds to block 479. If not, then the print server logic 236 reverts back to block 450 as shown. In block 479 the print server logic 236 sets the print status to "available" by setting the status bit previously mentioned, for example, to a logic "0". Thereafter, the print server logic 236 reverts back to block 450.

Although the logic 159 (FIG. 1), 196 (FIG. 1), and 236 (FIG. 1) of the present invention is embodied in software as discussed above, as an alternative the logic 159, 196, and 236 may also be embodied in hardware or a combination of software and hardware. If embodied in hardware, the logic 159, 196, and 236 can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

The flow charts of FIGS. 3–5 show the architecture, functionality, and operation of an implementation of the logic 159, 196, and 236. If embodied in software, each block may represent a module, segment, or portion of code that comprises one or more executable instructions to implement the specified logical function(s). If embodied in hardware, each block may represent a circuit or a number of interconnected circuits to implement the specified logical function(s). Although the flow charts of FIGS. 3–5 show a specific order of execution, it is understood that the order of execution may differ from that which is depicted. For example, the order of execution of two or more blocks may be scrambled relative to the order shown. Also, two or more blocks shown in succession in FIGS. 3–5 may be executed concurrently or with partial concurrence. It is understood that all such variations are within the scope of the present invention.

Also, the logic 159, 196, and 236 can be embodied in any computer-readable medium for use by or in connection with an instruction execution system such as a computer/processor based system or other system that can fetch or obtain the logic from the computer-readable medium and execute the instructions contained therein. In the context of this document, a "computer-readable medium" can be any medium that can contain, store, or maintain the logic 159, 196, and 236 for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, a portable magnetic computer diskette such as floppy diskettes or hard drives, a random access memory (RAM), a read-only memory (ROM), an erasable programmable read-only memory, or a portable compact disc.

Many variations and modifications may be made to the above-described embodiment(s) of the invention without departing substantially from the spirit and principles of the invention. All such modifications and variations are intended to be included herein within the scope of the present invention.

What is claimed is:

1. A method for printing on a network, comprising the steps of:

generating a print job ticket in a client, the print job ticket being associated with a full print job;

transmitting the print job ticket over the network to a queue server;

placing the print job ticket in a queue in the queue server;

determining in the queue server whether a printer is available to print the full print job associated with the print job ticket;

transmitting the print job ticket over the network from the queue server to a print server when it is determined that the printer is available to print the full print job, the print server being associated with the printer;

transmitting a request for a full print job from the print server to the client; and transmitting the full print job from the client to the print server in response to the request.

2. The method of claim 1, wherein the step of transmitting a request for a full print job from the print server to the client further comprises the step of determining an address of the client on the network.

3. The method of claim 1, wherein the step of generating a print job ticket in a client further comprises the steps of:

writing a number of pages of the full print job into the print job ticket;

writing the address of the client into the print job ticket; and writing a print job identifier into the print job ticket, the print job identifier being associated with the full print job.

4. The method of claim 1, wherein the step of determining in the queue server whether the printer is available to print the full print job associated with the print job ticket further comprises the step of transmitting a printer polling message from the queue server over the network to the print server to determine if the printer is available to print the full print job.

5. The method of claim 1, wherein the step of determining in the queue server whether the printer is available to print the full print job associated with the print job ticket further comprises the step of waiting in the queue server to receive a printer availability signal transmitted from the print server over the network to the queue server, the printer availability signal indicating that the printer is available to print the full print job.

6. A system on a network for printing a document, comprising:

a client coupled to the network, the client having a first processor coupled to first local interface and a first memory coupled to the first local interface, the client further comprising send job logic stored on the first memory and executable by the first processor, the send job logic comprising:

logic to generate a print job ticket associated with a full print job; and logic to transmit the print job ticket to a queue server;

the queue server being coupled to the network, the queue server having a second processor coupled to second local interface and a second memory coupled to the second local interface, the queue server further comprising print queue logic stored on the second memory and executable by the second processor, the print queue logic comprising:

logic to place the print job ticket in a queue in the queue server; and logic to transmit the print job ticket from the queue server over the network to a print server; and the print server being coupled to the network, the print server having a third processor coupled to third local interface and a third memory coupled to the third local interface, the print server further comprising print server logic stored on the third memory and executable by the third processor, the print server logic comprising:

logic to determine an address of the client on the network from the print job ticket received from the queue server;

logic to transmit a request for a full print job to the client; and logic to apply the full print job received from the client to the printer.

* * * * *